3,227,759
N-(SUBSTITUTED PHENYL)-ARALKYL AMINES
Sidney B. Richter and David P. Mayer, Chicago, Ill., assignors to Velsicol Chemical Corporation, Chicago, Ill., a corporation of Illinois
No Drawing. Filed July 10, 1962, Ser. No. 208,929
6 Claims. (Cl. 260—570.9)

This invention relates to the production of new pesticidal compositions of matter. More specifically, this invention relates to new chemical compounds of the general formula

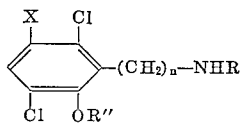

wherein X is chlorine or hydrogen, $n$ is a whole number from one to three, R″ is lower unsubstituted alkyl, and R is a phenyl radical substituted with from one to three substituents selected from the group consisting of bromine, chlorine, lower unsubstituted alkyl, lower unsubstituted alkoxy, lower unsubstituted alkylmercapto, hydroxy, mercapto, and nitro. The compounds of this invention can also be represented by the following general formula

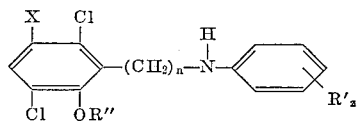

wherein X is chlorine or hydrogen, $n$ and $z$ are whole numbers from one to three, R″ is lower unsubstituted alkyl, and R′ is selected from the group consisting of bromine, chlorine, lower unsubstituted alkyl, lower unsubstituted alkoxy, lower unsubstituted alkylmercapto, hydroxy, mercapto, and nitro radicals. By lower alkyl, lower alkoxy, and lower alkylmercapto radicals are meant those containing up to four carbon atoms. The new compounds of this invention are useful as pesticides, particularly as insecticides, miticides, and herbicides.

The new compounds of this invention can be prepared by the condensation of compounds of the formula

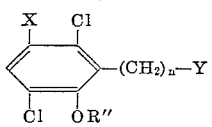

wherein $n$, R″, and X are as defined above and Y is chlorine or bromine with amines H₂NR, wherein R is also as defined above. Preferred starting materials of the given formula are either 2-methoxy-3,6-dichlorobenzyl chloride or 2-methoxy-3,5,6-trichlorobenzyl chloride, which can be obtained conveniently from carboxylic acid esters of 2-methoxy-3,6-dichlorobenzoic acid or 2-methoxy-3,5,6-trichlorobenzoic acid, reprectively, by reduction to the corresponding benzyl alcohol with a reagent such as lithium aluminum hydride, followed by treatment with a reagent such as thionyl chloride to form the desired benzyl chloride. Starting materials where $n$ is two can be prepared by the same reaction steps starting from carboxylic acid esters of 2-methoxy-3,6-dichlorophenylacetic acid or 2-methoxy-3,5,6-trichlorophenylacetic acid. Starting materials wherein —OR″ is butoxy, for example, can be obtained similarly from carboxylic acid esters of 2-butoxy-3,6-dichlorobenzoic acid or 2-butoxy-3,5,6-trichlorobenzoic acid, themselves obtainable from the 3,6-dichloro- and 3,5,6-trichlorosalicylic acids by treatment with butyl iodide and silver oxide.

If it is desired to prepare compounds of this invention where $n$ is three, suitable starting materials can be obtained from 2,5-dichlorophenol or 2,4,5-trichlorophenol. For example, treatment of the phenol with allyl bromide in the presence of potassium carbonate yields the allyl ether, which can then be rearranged by heating to form the phenol wherein an allyl group is present on the ring ortho to the phenolic OH. Treatment of the intermediate with HBr in the presence of peroxide, for example, then gives the desired 2-methoxy-3,6-dichloro(3-bromopropyl)benzene or 2-methoxy-3,5,6-trichloro(3-bromopropyl)benzene.

Suitable reactants of the formula H₂NR include a wide variety of anilines substituted with R′$_z$ as defined above. Some typical suitable reactants are, for example, m-bromoaniline,
p-bromoaniline,
2-bromo-4-tert-butylaniline,
2-bromo-4-ethylaniline,
5-bromo-2-(ethylthio)aniline,
2-bromo-6-isopropylaniline,
2-bromo-4-nitroaniline,
m-butoxyaniline,
2-butoxy-5-nitroaniline,
p-tert-butylaniline,
5-butyl-2-chloroaniline,
5-butyl-2-ethylaniline,
4-butyl-3-nitroaniline,
m-chloroaniline,
2-chloro-3-nitroaniline,
2,4-dibromoaniline,
2,6-dibromo-4-nitroaniline,
2,4-dichloroaniline,
2,5-dichloroaniline,
3,4-dichloroaniline,
3,5-dichloroaniline,
2,4-dichloro-5-nitroaniline,
2-ethyl-6-nitroaniline,
p-(ethylthio)aniline,
o-methylthioaniline,
m-methylthioaniline,
p-methylthioaniline,
2-(methylthio)-5-nitroaniline,
m-nitroaniline,
o-propoxyaniline,
m-propylaniline,
p-(propylthio)aniline,
2,4,6-tribromoaniline,
2,4,5-trichloroaniline,
2,4,6-trichloroaniline,
3,4,5-trichloroaniline,
p-(butylthio)aniline,
4-bromo-m-anisidine (where anisidine is ar-methoxyaniline),
2-chloro-m-anisidine,
4-chloro-m-anisidine,
6-chloro-m-anisidine,
2-nitro-m-anisidine,
4-nitro-m-anisidine,
3-bromo-o-anisidine,
4-chloro-o-anisidine,
5-chloro-o-anisidine,
3,5-dichloro-o-anisidine,
4,5-dichloro-o-anisidine,
4-nitro-o-anisidine,
3-bromo-p-anisidine,
3-chloro-p-anisidine,
5-chloro-2-nitro-p-anisidine,
3,5-dibromo-p-anisidine,
3,5-dichloro-p-anisidine,
2-nitro-p-anisidine, 2-chloro-m-toluidine (where toluidine is ar-methylaniline),
4-nitro-m-toluidine,
4-bromo-o-toluidine,
4-chloro-o-toluidine,
4,5-dibromo-o-toluidine,
4,5-dichloro-o-toluidine,
3-nitro-o-toluidine,
2-bromo-p-toluidine,
3-chloro-p-toluidine,
3,5-dibromo-p-toluidine,
3-nitro-p-toluidine,
m-aminophenol,
o-aminophenol,
p-aminophenol,
o-aminobenzenethiol,
m-aminobenzenethiol,
p-aminobenzenethiol, and the like.

The designation "methylthio" has been retained for the group $CH_3S—$, for example, according to Chemical Abstracts indexing of such known starting materials. However, it is preferred for the new compounds of this invention to use the designation "methylmercapto" for the same group. Other members of the lower alkylmercapto group are named similarly.

When the condensation reaction to form the new compounds of this invention is carried out, an excess of the amine should be used, since the hydrogen halide released during the reaction is taken up by some of the free amine. Preferably two moles of amine are used for each mole of the halide starting material. Further, many of the substituted anilines $H_2NR$ are not strongly basic, and it is often desirable to incorporate an acid scavenger such as sodium bicarbonate in the reaction mixture. The reaction can be carried out conveniently by heating the reactants, preferably in an inert solvent such as benzene or toluene. The exact reaction temperatures are not critical, since the reaction will often take place at normal room temperature; however, temperatures which are the normal reflux temperature of the reaction mixture are preferred. The reaction will often be complete in a few hours. Generally, a precipitate of amine hydrochloride or hydrobromide will form in the reaction mixture and can be filtered off. The product can be isolated from the reaction mixture by ether extraction; and it can be purified by crystallization, fractional distillation, or other techniques known to the art. Although the reaction is normally carried out at atmospheric pressure, sub- or superatmospheric pressures can also be used if desired.

The manner in which typical new compounds of this invention can be prepared is illustrated in the following examples. All temperatures are in degrees centigrade.

EXAMPLE 1

*Preparation of 2-methoxy-3,6-dichlorobenzyl alcohol*

Lithium aluminum hydride (117 g.; 3.0 moles) was stirred with about 2.5 l. of anhydrous ether in a 5-l. flask. A dried solution of methyl 2-methoxy-3,6-dichloro-benzoate (705 g.; 3.0 moles) in 1.5 l. of ether was added dropwise with stirring over a period of 1 hr. The temperature of the reaction mixture was maintained at about $-40°$ by external cooling. After the addition, the stirring was continued for 3.5 hours, during which time the temperature was allowed to rise to $0°$. Water was then added until the evolution of hydrogen nearly ceased, after which a 20% solution of HCl was added until two layers separated. The ether layer was separated and combined with an ether extraction of the aqueous layer. The ether solution was dried over magnesium sulfate, filtered, and evaporated on the steam bath to give a residue which solidified on cooling to 597 g. (96% of theory) of white 2-methoxy-3,6-dichlorobenzyl alcohol, M.P. 63–67°.

EXAMPLE 2

*Preparation of 2-methoxy-3,6-dichlorobenzyl chloride*

2-methoxy-3,6-dichlorobenzyl alcohol (564 g.; 2.72 moles), pyridine (215 g.; 2.72 moles), and 3 l. toluene were placed in a 5-l. flask. Thionyl chloride (700 g.; 5.8 moles) was added dropwise with stirring over a period of 0.5 hr. The mixture was refluxed for 5 hrs. and filtered. The filter cake was washed thrice with 200-ml. portions of benzene; and the benzene washings were combined with the toluene solution. The combined solution was evaporated under reduced pressure, and the residue was distilled in vacuo to give 497 g. (81% of theory) of light tan 2-methoxy-3,6-dichlorobenzyl chloride, B.P. $100°/0.6$ mm., which solidified on standing.

EXAMPLE 3

*Preparation of N-(3,4-dichlorophenyl)-2-methoxy-3,6-dichlorobenzylamine*

A mixture of 342 g. 3.4-dichloroaniline, 88 g. sodium bicarbonate, and 80 ml. water was stirred and heated to about 80° in a 2-l. flask to melt the solid. Liquified 2-methoxy-3,6-dichlorobenzyl chloride (184 g.) was added over a period of 0.5 hr., and the mixture was then stirred and refluxed for 7 hrs. After cooling, about 500 ml. of ether was added. The ether layer was separated, washed with water, dried over magnesium sulfate, filtered, and evaporated. The residue was fractionally distilled in vacuo. After a forerun of the dichloroaniline at $102°/0.5$ mm. the main fraction yielded 213 g. (74% of theory) of yellow N-(3,4-dichlorophenyl)-2-methoxy-3,6-dichlorobenzylamine, B.P. $190–195°/0.25–0.3$ mm. which solidified on standing.

Another similar run on a smaller scale gave a 77.3% yield of product, B.P. $186–189°/0.3–0.4$ mm.

Analysis for $C_{14}H_{11}Cl_4NO$: Theory, percent: C, 47.89; H, 3.16; Cl, 40.40; N, 3.99. Found, percent: C, 48.13; H, 3.51; Cl, 40.07; N, 4.09.

A wide variety of other useful compounds within the scope of this invention can be prepared in a manner similar to that detailed above. Given in the following examples are the reactants which can be used to give the indicated name compounds of this invention. The compounds 2-methoxy-3,6-dichlorobenzyl chloride and 2-methoxy-3,5,6-trichlorobenzyl chloride have been designated as "A" and "B," respectively, for brevity.

EXAMPLE 4

A+m - chloroaniline=N - (3 - chlorophenyl) - 2-methoxy-3,6-dichlorobenzylamine.

EXAMPLE 5

A+p - chloroaniline=N - (4 - chlorophenyl) - 2 - methoxy-3,6-dichlorobenzylamine.

EXAMPLE 6

A+2,5 - dimethoxy - 4 - chloroaniline=N - (2,5 - dimethoxy - 4 - chlorophenyl) - 2 - methoxy - 3,6 - dichlorobenzylamine.

EXAMPLE 7

A+p - methylthioaniline=N - (4 - methylmercaptophenyl)-2-methoxy-3,6-dichlorobenzylamine.

EXAMPLE 8

A+p - anisidine=N - (4 - methoxyphenyl) - 2 - methoxy-3,6-dichlorobenzylamine.

EXAMPLE 9

A+p - nitroaniline=N - (4 - nitrophenyl) - 2 - methoxy-3,6-dichlorobenzylamine.

EXAMPLE 10

A+3 - chloro - p - toluidine=N - (3 - chloro - 4 - methylphenyl)-2-methoxy-3,6-dichlorobenzylamine.

EXAMPLE 11

A+3 - chloro - p - anisidine=N - (3 - chloro - 4 - methoxyphenyl)-2-methoxy-3,6-dichlorobenzylamine.

EXAMPLE 12

A+4,5 - dichloro - o - anisidine=N - (2 - methoxy - 4,5-dichlorophenyl)-2-methoxy-3,6-dichlorobenzylamine.

EXAMPLE 13

B+3,4,5 - trichloroaniline=N - (3,4,5 - trichlorophenyl)-2-methoxy-3,5,6-trichlorobenzylamine.

EXAMPLE 14

B+m - butoxyaniline=N - (3 - butoxyphenyl) - 2-methoxy-3,5,6-trichlorobenzylamine.

EXAMPLE 15

B+p - (butylthio)aniline=N - [4 - (butylmercapto)phenyl]-2-methoxy-3,5,6-trichlorobenzylamine.

EXAMPLE 16

B+p - tert - butylaniline=N - (4 - tert - butylphenyl)-2-methoxy-3,5,6-trichlorobenzylamine.

EXAMPLE 17

2 - methoxy - 3,6 - dichloro(2 - chloroethyl)benzene+3,4 - dichloroaniline=N - (3,4 - dichlorophenyl) - 2-methoxy-3,6-dichlorophenethylamine.

EXAMPLE 18

2 - methoxy - 3,5,6 - trichloro(2 - chloroethyl)benzene+p - chloroaniline=N - (4 - chlorophenyl) - 2 - methoxy-3,5,6-trichlorophenethylamine.

EXAMPLE 19

2 - methoxy - 3,6 - dichloro(3 - bromopropyl)benzene+3,4 - dichloroaniline=N - (3,4 - dichlorophenyl) - 3-(2-methoxy-3,6-dichlorophenyl)propylamine.

EXAMPLE 20

2 - methoxy - 3,5,6 - trichloro(3 - bromopropyl)benzene+p - chloroaniline=N - (4 - chlorophenyl) - 3 - (2-methoxy-3,5,6-trichlorophenyl)propylamine.

EXAMPLE 21

A+p - aminophenol=N - (4 - hydroxyphenyl) - 2-methoxy-3,6-dichlorobenzylamine.

EXAMPLE 22

A+p - aminobenzenethiol=N - (4 - mercaptophenyl)-2-methoxy-3,6-dichlorobenzylamine.

For practical use as pesticides, the compounds of this invention are generally incorporated into herbicidal, insecticidal, and miticidal compositions which comprise an inert carrier and a pesticidally toxic amount of such a compound. Such compositions, which are usually known in the art as formulations, enable the active compound to be applied conveniently to the site of the pest infestation in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent on to and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of insecticides can be dispersed under superatmospheric pressure as aerosols. However, preferred liquid compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the pest infestation. The emulsifiers most commonly used in these concentrates are nonionic or mixtures of nonionic with anionic surface-active agents.

A typical composition according to this invention is illustrated by the following example, in which the quantities are in parts by weight.

EXAMPLE 23

*Preparation of a dust*

Product of Example 3 _____ 10
Powdered talc _____ 90

The above ingredients are mixed in a mechanical grinder-blender and are ground until a homogeneous, free-flowing dust of the desired particle size is obtained. This dust is suitable for direct application to the site of the pest infestation.

The pesticides of this invention can be applied in any manner recognized by the art. The concentration of the new compounds of this invention in the compositions will vary greatly with the type of formulation and the purpose for which it is designed, but generally the compositions will comprise from about 0.05 to about 95 percent by weight of the active compounds of this invention. In a preferred embodiment of this invention, the compositions will comprise from about 5 to about 75 percent by weight of the active compound. The compositions can also comprise such additional substances as other pesticides, spreaders, adhesives, stickers, fertilizers, activators, synergists, and the like.

The new compounds of this invention can be used in many ways for the control of insects and mites. Insecticides which are to be used as stomach poisons or protective materials can be applied to the surface on which the insects feed or travel. Insecticides which are to be used as contact poisons or eradicants can be applied directly to the body of the insect, as a residual treatment to the surface on which the insect may walk or crawl, or as a fumigant treatment of the air which the insect breathes. In some cases, the compounds applied to the soil or plant surfaces are taken up by the plant, and the insects are poisoned systematically.

The above methods of using insecticides are based on the fact that almost all the injury done by insects is a direct or indirect result of their attempts to secure food. Indeed, the large number of destructive insects can be classified broadly on the basis of their feeding habits. There are, for example, the chewing insects such as the Mexican bean beetle, the southern armyworm, cabbageworms, grasshoppers, the Colorado potato beetle, the cankerworm, and the gypsy worm. There are also the piercing-sucking insects, such as the pea aphid, the house fly, the chinch bug, leafhoppers, and plant bugs.

Another group of insects comprises the internal feeders. These include borers such as the European corn borer and the corn earworm; worms or weevils such as the codling moth, cotton boll weevil, plum curculio, melonworm, and the apple maggot; leaf miners such as the apple leaf miner and the beet leaf miner; and gall insects such as the wheat jointworm and grape phylloxera. Insects which attack below the surface of the ground are classified as subterranean insects and include such destructive pests as the woolly apple aphid, the Japanese beetle, and the corn rootworm.

Mites and ticks are not true insects. Many economically important species of mites and ticks are known, including the red spider mite, the strawberry spider mite, the cattle tick, and the poultry mite. Chemicals useful for control of mites are often called miticides, while those useful for the control of both mites and ticks are known specifically as acaricides.

The quantity of active compound of this invention to be used for insect control will depend on a variety of factors, such as the specific insect involved, intensity of the infestation, weather, type of environment, type of formulation, and the like. For example, the application of only one or two ounces of active chemical per acre may be adequate for control of a light infestation of an insect under conditions unfavorable for its feeding, while a pound or more of active compound per acre may be required for the control of a heavy infestation of insects under conditions favorable to their development.

Weeds are undesirable plants in their growing where they are not wanted, having no economic value, and interfering with the production of cultivated crops or with the welfare of livestock. Many types of weeds are known, including annuals such as pigweed, lambsquarters, yellow foxtail, crabgrass, wild mustard, French-weed, rye-grass, goose-grass, chickweed, and smartweed; biennials such as wild carrot, great burdock, mullein, round-leaved mallow, blue thistle, bull thistle, hounds-tongue, moth mullein, and purple star thistle; or perennials such as white cockle, perennial rye-grass, quackgrass, Johnson grass, Canada thistle, hedge bindweed, Bermuda grass, sheep sorrel, field chickweed, and winter-cress. Similarly, such weeds can be classified as broad-leaf or grassy weeds. It is economically desirable to control the growth of such weeds without damaging beneficial plants or livestock.

The new compounds of this invention are particularly valuable for weed control because they are toxic to many species and groups of weeds while they are relatively non-toxic to many beneficial plants. The method of this invention for the control of weeds comprises contacting said weeds with a herbicidal composition comprising an inert carrier and as the essential active ingredient, in a quantity which is herbicidally toxic to said weeds, a compound of this invention. The exact amount of compound required will depend on a variety of factors, including the hardiness of the particular weed species, weather, method of application, the kind of beneficial plants in the same area, and the like. Thus, while the application of up to only about one or two ounces of an active compound per acre may be sufficient for good control of a light infestation of weeds growing under adverse conditions, the application of one pound or more of active compound per acre may be required for good control of a dense infestation of hardy weeds growing under favorable conditions.

The pesticidal activity of the new compounds of this invention can be illustrated by many of the testing techniques known to the art. For example, the test compounds can be formulated at a concentration of 0.35% on a weight/volume basis, with 100 ml. distilled water, 0.5 ml. benzene as solvent, and 0.5 ml. Triton X–100 (an alkyl aryl polyether alcohol emulsifier). Such emulsions of typical compounds of this invention can be shown to have toxic action on a variety of insects and mites.

Further, the herbicidal activity of the new compounds of this invention can be illustrated by a variety of testing techniques. For example, emulsifiable concentrate compositions were diluted with water to concentrations equivalent to 4 pounds of the active compound per acre. Duplicate paper pots filled with a sand and soil mixture were seeded with weeds; and immediately after seeding, the soil surface of each pot was sprayed with an appropriately diluted test solution. The weed growth was maintained under artificial lighting with irrigation provided by placing the porous pots in a small amount of water in stainless steel trays. The weeds were observed for a week to ten days; and the percent kill, injury, and stand reduction were recorded. In these tests, the product of Example 3, namely N-(3,4-dichlorophenyl)-2-methoxy-3,6-dichlorobenzylamine, caused the death of mustard and pigweed while untreated control plants showed completely normal growth. The same compound was also very toxic to these weeds in comparable post-emergence experiments.

What is claimed is:

1. A compound of the general formula

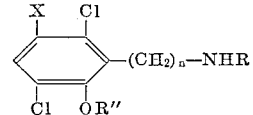

wherein X is selected from the group consisting of chlorine and hydrogen, R″ is lower unsubstituted alkyl, $n$ is a whole number from one to three, and R is a phenyl radical substituted with from one to three substituents selected from the group consisting of bromine, chlorine, lower unsubstituted alkyl, lower unsubstituted alkoxy, lower unsubstituted alkylmercapto, hydroxy, mercapto, and nitro.

2. N-(3,4-dichlorophenyl)-2-methoxy-3,6-dichlorobenzylamine.

3. N - (4-chlorophenyl)-2-methoxy-3,6-dichlorobenzylamine.

4. N-(2,5-dimethoxy-4-chlorophenyl)-2-methoxy-3,6-dichlorobenzylamine.

5. N - (4 - methylmercaptophenyl)-2-methoxy-3,6-dichlorobenzylamine.

6. N - (4-nitrophenyl)-2-methoxy-3,6-dichlorobenzylamine.

References Cited by the Examiner
UNITED STATES PATENTS

| | | | |
|---|---|---|---|
| 2,764,591 | 9/1956 | Sprinzak | 260—570.9 XR |
| 2,784,138 | 3/1957 | Wegler et al. | 260—570.9 XR |
| 2,862,966 | 12/1958 | Surrey | 260—570.9 XR |
| 2,962,531 | 11/1960 | Coffield | 260—570.9 |
| 2,981,619 | 4/1961 | Josephs | 71—2.5 |
| 3,070,628 | 12/1962 | Lemin | 260—570.9 |
| 3,072,472 | 1/1963 | Josephs | 71—2.3 |
| 3,113,067 | 12/1963 | Strufe et al. | 167—30 |

CHARLES B. PARKER, *Primary Examiner.*

JULIAN S. LEVITT, *Examiner.*